(12) United States Patent
Tomiyasu et al.

(10) Patent No.: US 11,368,561 B2
(45) Date of Patent: Jun. 21, 2022

(54) IMAGE FORMING APPARATUS AND DATA TRANSFER METHOD

(71) Applicant: KONICA MINOLTA, INC., Tokyo (JP)

(72) Inventors: Kazuhiro Tomiyasu, Toyokawa (JP); Kaoru Fukuoka, Toyokawa (JP); Hiroaki Sugimoto, Nagoya (JP)

(73) Assignee: KONICA MINOLTA, INC., Tokyo (JP)

( * ) Notice: Subject to any disclaimer, the term of this patent is extended or adjusted under 35 U.S.C. 154(b) by 78 days.

(21) Appl. No.: 16/913,002

(22) Filed: Jun. 26, 2020

(65) Prior Publication Data

US 2020/0412844 A1  Dec. 31, 2020

(30) Foreign Application Priority Data

Jun. 28, 2019 (JP) .............................. JP2019-120745

(51) Int. Cl.
*H04N 1/00* (2006.01)
*H04L 69/18* (2022.01)

(52) U.S. Cl.
CPC ......... *H04L 69/18* (2013.01); *H04N 1/00877* (2013.01); *H04N 1/00928* (2013.01)

(58) Field of Classification Search
CPC .................................................. H04L 69/165
See application file for complete search history.

(56) References Cited

U.S. PATENT DOCUMENTS

| 2011/0066751 | A1* | 3/2011 | Niikura | H04L 69/165 |
| | | | | 709/232 |
| 2011/0219249 | A1* | 9/2011 | Kuwahara | G06F 1/00 |
| | | | | 713/323 |
| 2012/0233702 | A1* | 9/2012 | Matsuda | G06F 21/608 |
| | | | | 726/26 |
| 2017/0005829 | A1* | 1/2017 | Kouno | H04L 63/0281 |
| 2019/0332256 | A1* | 10/2019 | Furumoto | G06F 3/04847 |

FOREIGN PATENT DOCUMENTS

JP          2018109698 A      7/2018

* cited by examiner

*Primary Examiner* — Benjamin O Dulaney
(74) *Attorney, Agent, or Firm* — Buchanan Ingersoll & Rooney PC

(57) ABSTRACT

An image forming apparatus includes an image forming unit including a scanner and a printer, a server, and a local network circuit connecting the image forming unit and the server. In each of the image forming unit and the server, a hardware processor selects one of a first communication protocol and a second communication protocol in accordance with data to be transmitted by a transceiver. The first communication protocol includes a provision for ensuring reliability of communication, and the second communication protocol does not include a provision for ensuring reliability of communication.

17 Claims, 13 Drawing Sheets

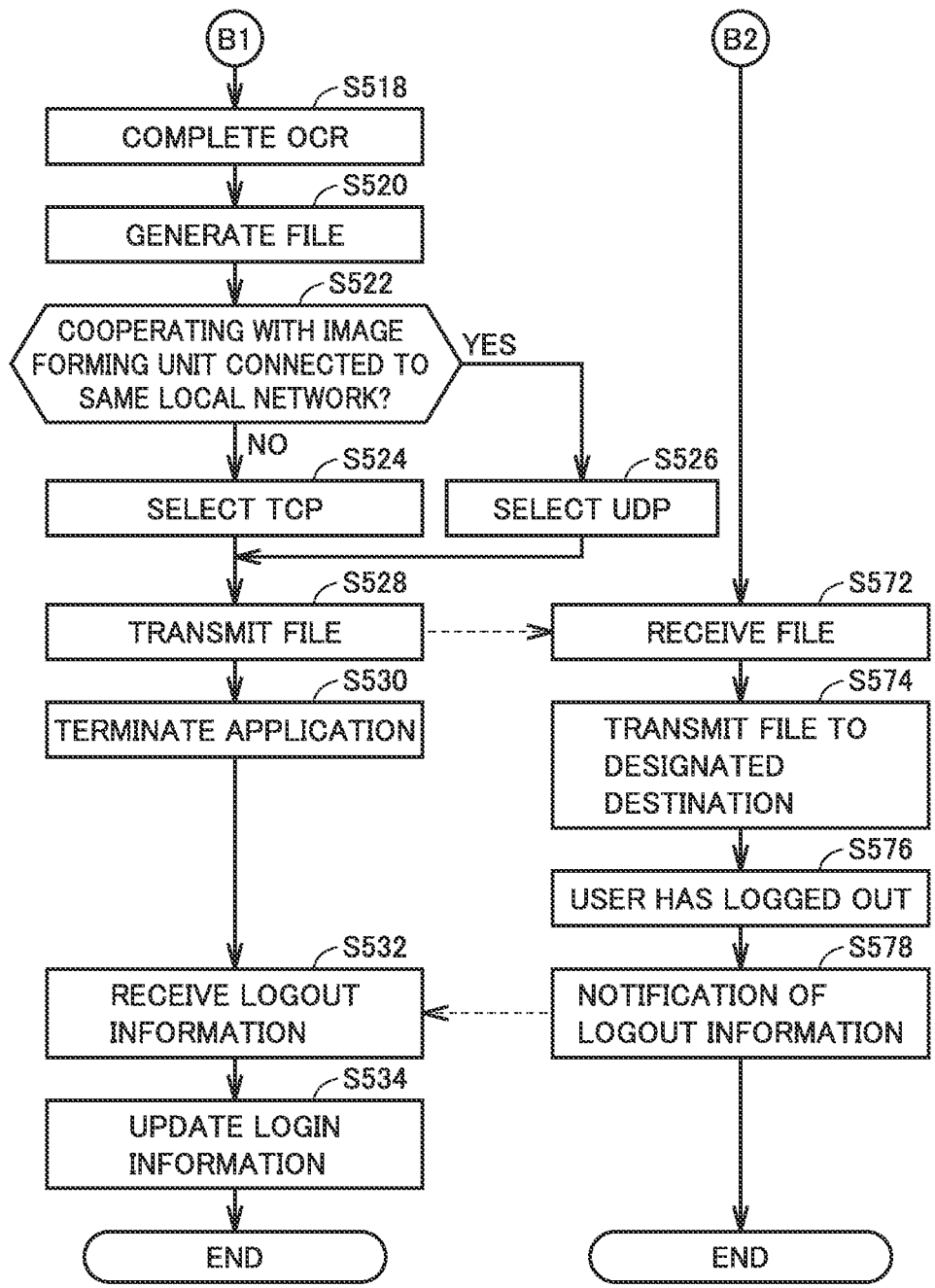

IMAGE FORMING APPARATUS AND DATA TRANSFER METHOD

The entire disclosure of Japanese Patent Application No. 2019-120745, filed on Jun. 28, 2019, is incorporated herein by reference in its entirety.

BACKGROUND

Technological Field

The present disclosure relates to an image forming apparatus and more particularly to a server-contained image forming apparatus and a data transfer method inside the image forming apparatus.

Description of the Related Art

Multi Functional Peripherals (MFPs) that combine a copier, a printer, a facsimile, and the like are known. Conventionally, to construct a network environment in an office, for example, a server need to be separately prepared in addition to MFPs.

In recent years, there have been proposed MFPs that contain a server in the housing of the MFP (hereinafter referred to as server-contained MFP) so as to construct a network only by introducing an MFP alone. An example of the related arts disclosing server-contained MFPs is Japanese Laid-Open Patent Publication No. 2018-109698.

SUMMARY

In a server-contained MFP, the conventional MFP part (hereinafter referred to as an image forming unit) shares a touch panel with the contained server. However, the communication scheme used between the image forming unit and the server is basically the same as the communication scheme used between the image forming unit and an external server.

For example, for a communication protocol between the image forming unit and the server, TCP ensuring the content of communication is used as it is although they are in the same housing. Therefore, when the image forming unit and the server cooperate to transfer a large volume of image data, the communication takes long time and burdens a communication circuit.

The present disclosure is made in view of the problem described above. An object of the present disclosure is to reduce the time taken for data transfer between an image forming unit and a server in an image forming apparatus in which the image forming unit and the server are connected through a local network circuit.

To achieve at least one of the abovementioned objects, according to an aspect of the present invention, an image forming apparatus reflecting one aspect of the present invention comprises an image forming unit, a server, and a local network circuit. The image forming unit includes a scanner configured to scan a document to generate image data and a printer configured to print image data generated by the scanner or another image data on a recording medium. The local network circuit is configured to connect the image forming unit and the server. The image forming unit and the server each include a transceiver and a hardware processor. The transceiver transmits and receives data through the local network circuit. The hardware processor of one of the image forming unit and the server selects one of a first communication protocol and a second communication protocol in accordance with data transmitted by the transceiver of the one of the image forming unit and the server when data is transmitted by the transceiver of the one to the transceiver of the other. The first communication protocol includes a provision for ensuring reliability of communication, and the second communication protocol does not include a provision for ensuring reliability of communication.

In another aspect, a data transfer method in an image forming apparatus is provided. The image forming apparatus includes an image forming unit including a scanner configured to scan a document to generate image data and a printer configured to print image data generated by the scanner or another image data on a recording medium, a server, and a local network circuit configured to connect the image forming unit and the server. The data transfer method comprises: selecting one of a first communication protocol and a second communication protocol in accordance with data to be transmitted, by a transmitter side of the image forming unit and the server, when data is transferred between the image forming unit and the server through the local network circuit; and transmitting data by the transmitter side to a receiver side using the selected communication protocol. Here, the first communication protocol includes a provision for ensuring reliability of communication, and the second communication protocol does not include a provision for ensuring reliability of communication.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 9B is a flowchart showing the procedure of an OCR process in image forming apparatus 500 in the third embodiment.

DETAILED DESCRIPTION OF EMBODIMENTS

Figure 1:
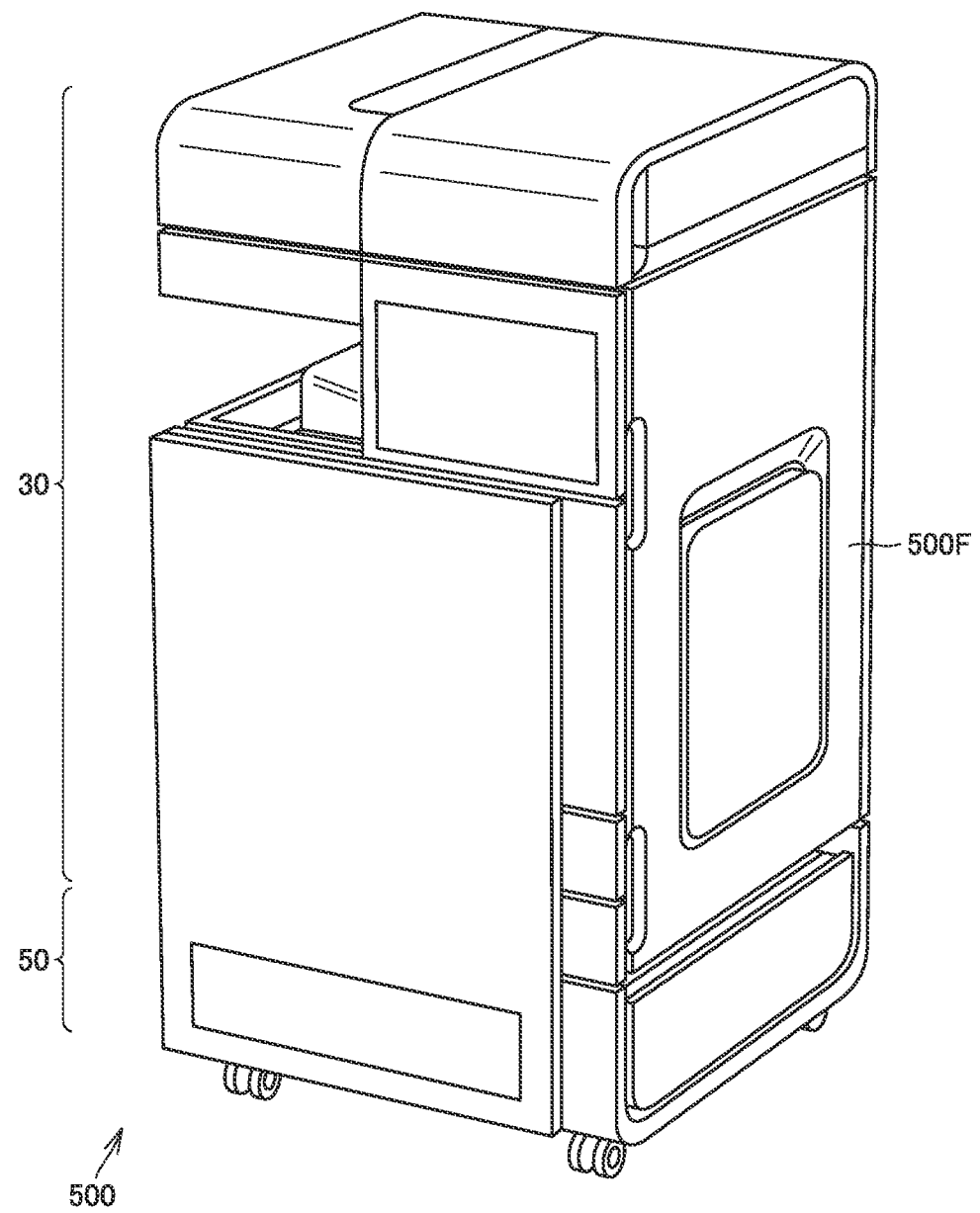
FIG. 1 is an overall perspective view showing an external configuration of an image forming apparatus 500.

Hereinafter, one or more embodiments of the present invention will be described with reference to the drawings. However, the scope of the invention is not limited to the disclosed embodiments.

When number, volume, etc. are referred to in the embodiments described below, the scope of the present disclosure is not necessarily limited to the noted number, volume, etc. unless otherwise specified.

In the figures, the drawings are not necessarily drawn to scale and the scale may be changed in the drawings so as to clarify a structure for easy understanding of the structure. The same or corresponding parts are denoted by the same reference signs and a description thereof will not be repeated. The embodiments described below may be selectively combined as appropriate.

First Embodiment

A. Hardware Configuration

First of all, a hardware configuration in the present embodiment is described.

FIG. 1 is an overall perspective view showing an external configuration of an image forming apparatus 500. Image forming apparatus 500 includes an image forming unit 30 and a server 50.

Image forming unit 30 is a part corresponding to a conventional MFP that does not contain a server. An example of the hardware configuration of image forming unit 30 is described later with reference to FIG. 2.

Figure 2:
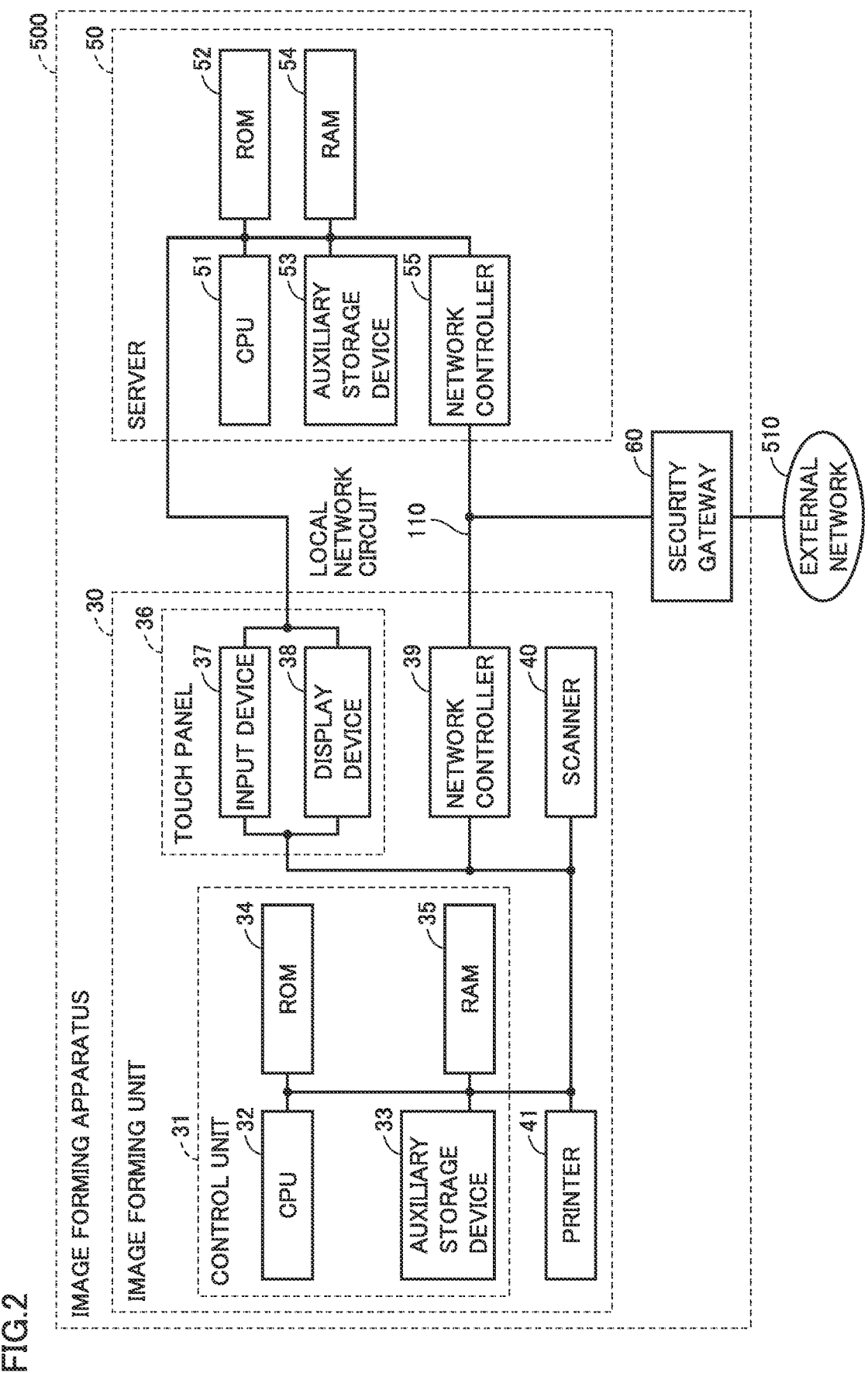
FIG. 2 is a block diagram illustrating an example of the hardware configuration of image forming apparatus 500.

Server 50 is connected to image forming unit 30 through a local network circuit (reference sign 110 in FIG. 2). In the present example, the local network is a network internal to image forming apparatus 500. Image forming unit 30 functions as a client device of server 50. An example of the hardware configuration of server 50 is described later with reference to FIG. 2.

In the present embodiment, image forming unit 30 and server 50 are contained in one housing 500F to configure a server-contained MFP. However, image forming unit 30 and server 50 are not necessarily contained in the same housing as long as they are connected through local network circuit 110 and thereby configured integrally.

FIG. 2 is a block diagram illustrating an example of the hardware configuration of image forming apparatus 500. Referring to FIG. 2, image forming apparatus 500 includes image forming unit 30, server 50, and local network circuit 110.

Image forming unit 30 includes a control unit 31, a touch panel 36, a network controller 39, a scanner 40, and a printer 41.

Touch panel 36 includes a touchpad as an input device 37 for a variety of inputs and a liquid crystal panel or organic electro-luminescence (EL) display as a display device 38 for a variety of display. With such a configuration, the user directly touches the screen of touch panel 36 whereby the user can operate image forming unit 30 or server 50. Instead of touch panel 36, for example, a button input-type operation panel as input device 37 and a display panel as display device 38 may be separately provided. Touch panel 36 is used also for operation of server 50, and image forming unit 30 and server 50 share touch panel 36.

Network controller 39 connects image forming unit 30 to a communication network including a wired local area network (LAN) such as Ethernet (registered trademark) or a wireless LAN. Network controller 39 is not contained in control unit 31 in FIG. 2 but may be contained in control unit 31.

Scanner 40 optically reads a document set on a platen (not shown) to convert characters, symbols, images, and the like recorded on the document into image data (also referred to as "document image"). Optically reading a document may be referred to as "scanning" or "scan". Scanning by scanner 40 is performed, for example, based on the user's operation on touch panel 36. CPU 32 of control unit 31 transmits a document image obtained by scanning a document to server 50 through network controller 39. CPU 32 transmits the scanned document image to another image forming apparatus, a server, a personal computer (PC), and the like connected to external network 510, through a security gateway 60.

Printer 41 forms a document image generated using scanner 40 and image data (also referred to as "copy image") generated from print data transmitted from an external PC or the like, on a recording medium such as paper. As used herein print data is obtained by converting a rendering instruction issued by an operating system or an application program of a PC into a rendering instruction in a page description language, or is document data described in a file format such as Portable Document Format (PDF), Tagged Image File Format (TIFF), Joint Photographic Experts Group (JPEG), and XML Paper Specification (XPS). The rendering instruction converted into a page description language can be processed by printer 41 using a printer driver. Examples of methods of printing by printer 41 include electrophotography and inkjet.

Control unit 31 controls the entire image forming unit 30. Control unit 31 includes a central processing unit (CPU) 32, an auxiliary storage device 33, a read only memory (ROM) 34, and a random access memory (RAM) 35.

CPU 32 as a hardware processor operates in accordance with instructions of a program to perform numerical operations or determine conditions.

Auxiliary storage device 33 is a nonvolatile memory for storing image data, for example. Auxiliary storage device 33 is implemented by, for example, a hard disk drive (HDD), a solid state drive (SSD), a digital versatile disc-read only memory (DVD-ROM), a magnetic disc, an optical disc, a universal serial bus (USB) memory, or a floppy disc (registered trademark). Auxiliary storage device 33 stores document image scanned by scanner 40, print data, and the like.

Read only memory (ROM) 34 is a read-only nonvolatile memory. ROM 34 stores, for example, a program executed by CPU 32.

Random access memory (RAM) 35 is a volatile memory in which read and write is performed freely, and is used as a working area when a program is executed by CPU 32. RAM 35 includes, for example, a dynamic RAM (DRAM) and a static RAM (SRAM).

Server 50 includes a CPU 51, a ROM 52, a RAM 54, an auxiliary storage device 53, and a network controller 55 and shares touch panel 36 with image forming unit 30.

The configuration of CPU 51, ROM 52, auxiliary storage device 53, RAM 54, and network controller 55 are similar to the configuration of CPU 32, ROM 34, auxiliary storage device 33, and RAM 35 included in control unit 31 of image forming unit 30. The foregoing description of the elements that constitute server 50 will not be repeated.

Server 50 is connected to local network circuit 110 through network controller 55. Control unit 31 of image forming unit 30 is connected to common local network circuit 110 through network controller 39. The user therefore can use an application installed in server 50 using touch panel 36 to implement the function that image forming unit 30 and server 50 cooperate to perform. Examples of the function that image forming unit 30 and server 50 cooperate to perform include a preview function, an OCR function, and a pull print function in an application on server 50. These functions will be described in the second, third, and fourth embodiments.

In the present embodiment, local network circuit 110 is connected to an external network 510 through security gateway 60. However, local network circuit 110 and external network 510 are not necessarily connected to each other.

Security gateway 60 is a device interposed between local network circuit 110 and external network 510 for protecting the system from threats such as external computer viruses and hacking. Data transmission/reception between local network circuit 110 and external network 510 is performed through security gateway 60. Security gateway 60 may be a device in which a plurality of functions for enhancing security of a network, such as firewall, antivirus, and content filtering, are consolidated in one piece, that is, a unified threat management (UTM) device. Alternatively, security gateway 60 may be a device in which a device for firewall, a device for content filtering, and the like are combined as appropriate.

B. Functional Configuration

[Functional Configuration of Image Forming Apparatus 500]

Figure 3:
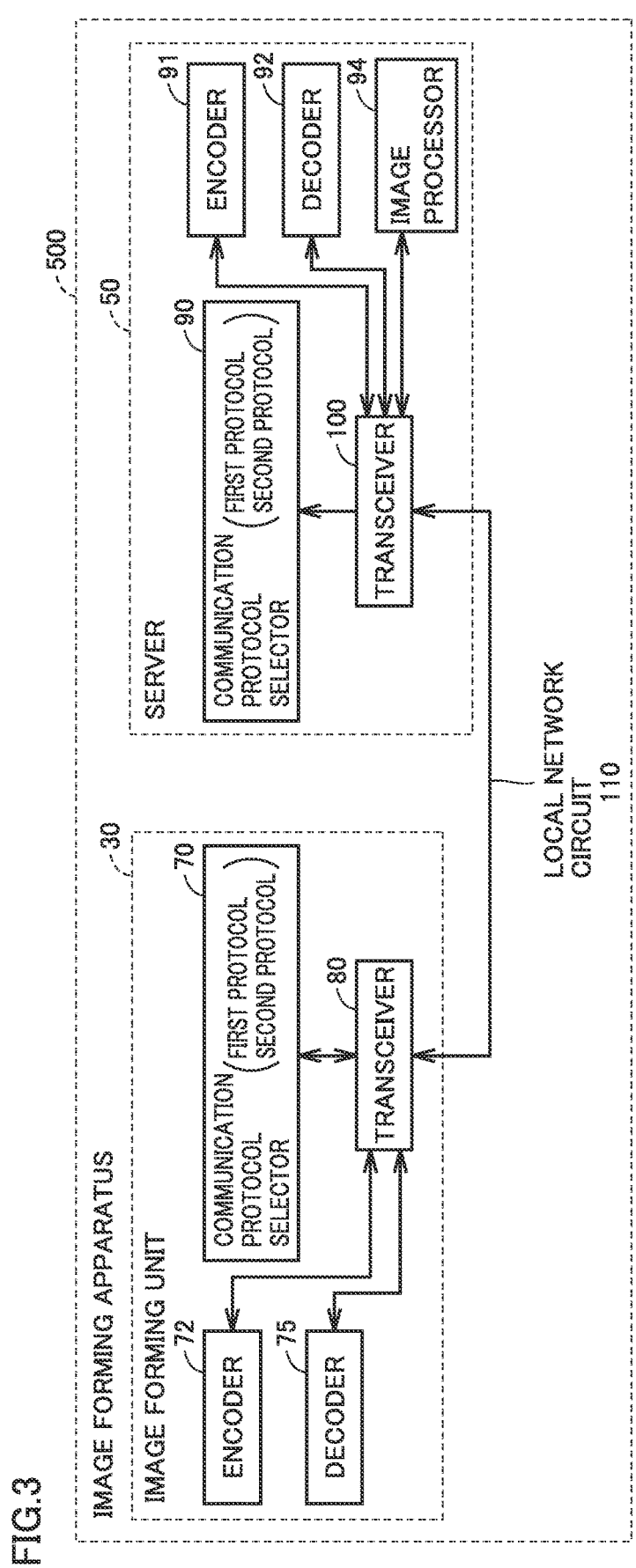
FIG. 3 is a block diagram mainly illustrating a communication function as a part of the functions of an image forming unit 30 and a server 50.

Specific functions in image forming apparatus 500 of the present embodiment, specifically, a communication function between image forming unit 30 and server 50 will now be described. FIG. 3 is a block diagram mainly illustrating the communication function as a part of the functions of image forming unit 30 and server 50. Communication between image forming unit 30 and server 50 is performed through local network circuit 110.

Image forming unit 30 includes, as its functional configuration, a communication protocol selector 70, an encoder 72, a decoder 75, and a transceiver 80.

The functions of communication protocol selector 70, encoder 72, and decoder 75 are implemented by CPU 32 in FIG. 2 operating in accordance with a program stored in ROM 34. The function of transceiver 80 is implemented by CPU 32 in FIG. 2 operating in accordance with a program to control network controller 39.

Communication protocol selector 70 selects a protocol to be used for communication. Communication protocol selector 70 selects one of TCP as a first communication protocol and UDP as a second communication protocol in accordance with data transmitted by transceiver 80 and a destination.

Encoder 72 and decoder 75 encode or decode data transmitted or received by transceiver 80, if encoding or decoding is necessary. Examples of encoding include compression, encryption, or data format conversion. In another aspect, conversion to PDF may be performed as data format conversion.

Transceiver 80 transmits/receives data using a communication protocol selected by communication protocol selector 70.

On the other hand, server 50 includes, as its functional configuration, a communication protocol selector 90, an encoder 91, a decoder 92, an image processor 94, and a transceiver 100.

The functions of communication protocol selector 90, encoder 91, decoder 92, and image processor 94 are implemented by CPU 51 in FIG. 2 operating in accordance with a program stored in ROM 52. The function of transceiver 100 is implemented by CPU 51 in FIG. 2 operating in accordance with a program to control network controller 55.

The functional configuration of communication protocol selector 90, encoder and decoder 92, and transceiver 100 of server 50 are similar to the functional configuration of communication protocol selector 70, encoder and decoder 75, and transceiver 80 of image forming unit 30. The description of the above elements that constitute server 50 will not be repeated.

Image processor 94 performs image processing such as an OCR process on the received data. The details of the OCR process will be described in the third embodiment.

[Targeted Network Model and Layers]

A network model used in the present embodiment will be described below.

For example, the Open Systems Interconnection (OSI) reference model or the Transmission Control Protocol/Internet Protocol (TCP/IP) model are commonly known as a model representing the functions of a network in layers.

In the present embodiment, among network models, the TCP/IP model widely prevalent is used. The functions of TCP/IP model are configured based on the following four-layer model. The layers are built up in the following order from bottom: the network interface layer, the internet layer, the transport layer, and the application layer. The function used in a layer is used in the higher-level layer. The features of the layers will be described briefly below.

The network interface layer implements communication with a device directly connected to a device on the transmitter side. Examples of the communication protocol of this layer include Ethernet configuring a wired network and Wi-Fi (Wireless Fidelity) (registered trademark) that is a typical standard of wireless LANs.

The internet layer adds a function such as relaying using the function of the network interface layer and implements communication with a device not directly connected to a device on the transmitter side, that is, a device in another network. An example of the communication protocol of this layer is IP that is one of main protocols that configure the TCP/IP model.

The transport layer controls data transfer using the function of the internet layer. Examples of the communication protocol of this layer include TCP and User Datagram Protocol (UDP). The detail of TCP and UDP will be described later.

The application layer implements the functions of individual applications using the function of the transport layer. Examples of the communication protocol of this layer include Hyper Text Transfer Protocol (HTTP) that is a protocol for accessing a web site, Simple Mail Transfer Protocol (SMTP) that is a protocol for transmitting emails, and Domain Name System (DNS) that is a communication protocol translating domain names to IP addresses.

TCP and UDP that are main communication protocols in the transport layer will be described below.

TCP includes a provision for performing communication after establishing a connection before starting communication and disconnecting a connection when terminating communication. TCP further includes provisions for ensuring reliability of communication, such as ensuring the order of packets with sequential numbers, checking whether received data has an error, checking that the other party receives data without errors, and requesting retransmission of unreceived data. In this way, in communication via TCP, since the connecting and disconnecting process and the process for ensuring the reliability of communication are performed, the time required for communication is longer compared with communication via UDP.

TCP is widely used in network applications that require reliability of communication, such as HTTP in the Web or SMTP for mail transmission/reception.

Unlike TCP, UDP includes a provision for sending data without establishing a connection in advance. Unlike TCP, UDP does not include a provision for ensuring the reliability of communication. The time required for communication using UDP is therefore shorter than the time required for communication using TCP.

UDP is often used when reduction of communication time has precedence over ensuring the reliability of the content of communication, as is the case with DNS frequently inquiring a server, sound and video streaming, or Internet telephony.

In the present embodiment, each of communication protocol selector 70 of image forming unit 30 and communication protocol selector 90 of server unit 50 selects one of TCP and UDP described above as a protocol of the transport layer, in accordance with data to be transmitted and a destination Referring to FIG. 4 to FIG. 7, selection of a communication protocol will be described below in more detail.

The selected communication protocol of the transport layer is not limited to TCP and UDP described above. More generally, a communication protocol that has a provision ensuring the reliability of communication as in TCP is denoted as a first communication protocol, and a communication protocol that does not have a provision ensuring the reliability of communication as in UDP is denoted as a second communication protocol. In this case, each communication protocol selector 70, 90 selects one of the first communication protocol and the second communication protocol in accordance with data to be communicated and a destination.

C. Operation Overview

In the following description, "transmitter side" and "receiver side" may be referred in connection with data transfer between image forming unit 30 and server 50. Specifically, when data is transmitted from image forming unit 30 to server 50, image forming unit 30 corresponds to the transmitter side and server 50 corresponds to the receiver side. In the opposite case, server 50 corresponds to the transmitter side and image forming unit 30 corresponds to the receiver side.

Figure 4:
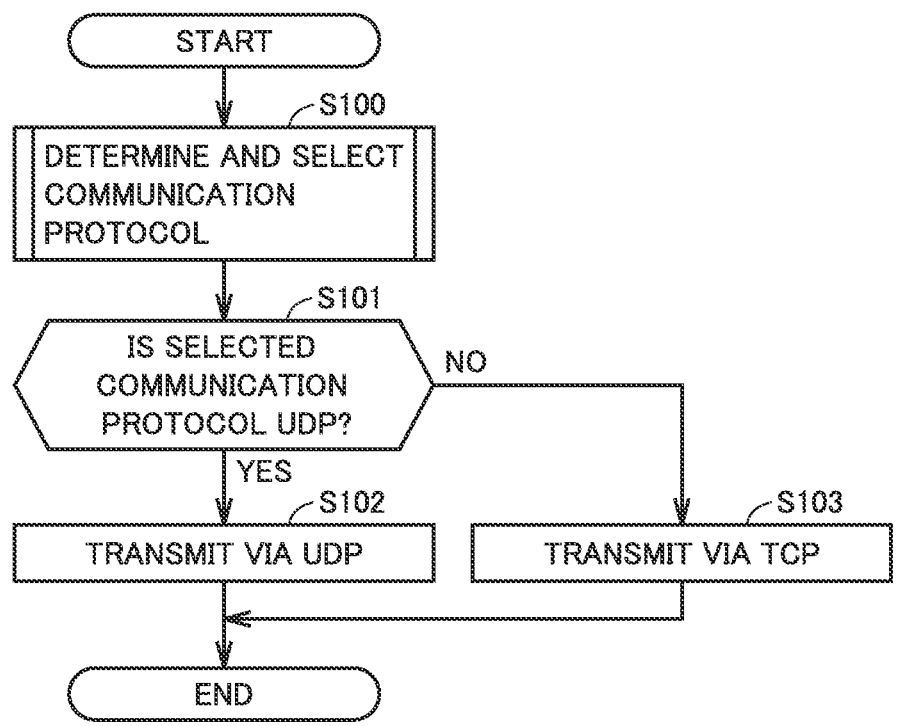
FIG. 4 is a flowchart showing a communication protocol switching operation and data transmission performed on the transmitter side of image forming apparatus 500.

Referring to FIG. 4, a control structure of image forming apparatus 500 will be described. FIG. 4 is a flowchart showing a main process for a communication protocol switching operation and data transmission performed on the transmitting side of image forming apparatus 500.

In step S100, communication protocol selector 70 or 90 on the transmitter side in FIG. 3 determines which of TCP and UDP to select in accordance with data to be transmitted and a destination. The detail of processing in step S100 will be described with reference to FIG. 5 to FIG. 7.

In step S101, if the selected communication protocol is UDP (YES in step S101), communication protocol selector 70 or 90 on the transmitter side proceeds to step S102. In step S102, transceiver 80 or 100 on the transmitter side in FIG. 3 transmits data to transceiver 80 or 100 on the receiver side, using UDP as the communication protocol of the transport layer.

On the other hand, in step S101, if the selected communication protocol is not UDP (NO in step S101), communication protocol selector 70 or 90 on the transmitter side proceeds to step S103. In step S103, transceiver 80 or 100 on the transmitter side transmits data to transceiver 80 or 100 on the receiver side, using TCP as the communication protocol of the transport layer.

[Transmission of Data from Image Forming Unit 30 to Server 50]

Figure 5:
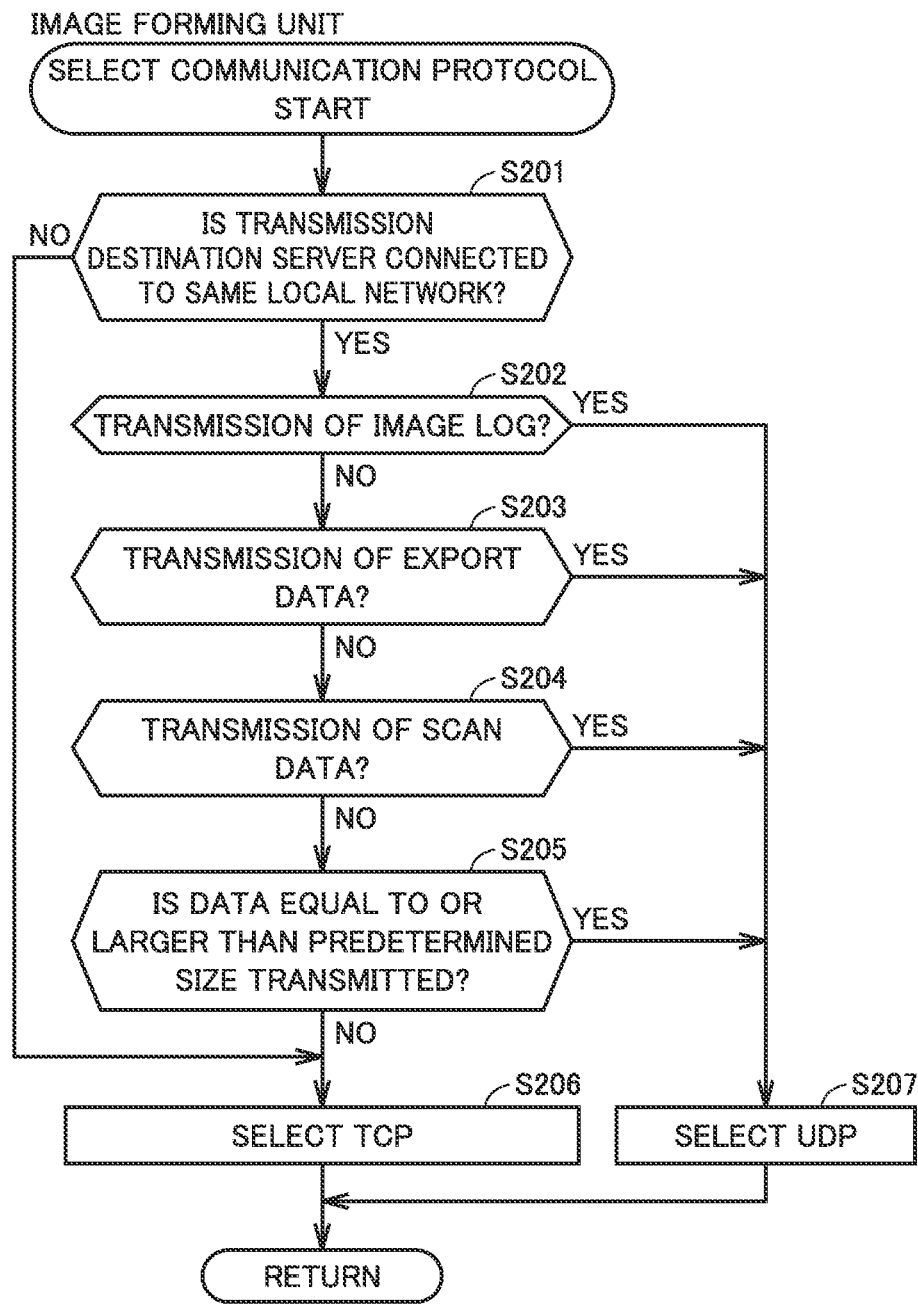
FIG. 5 is a flowchart showing an example of the process in step S100 in FIG. 4 in more detail.

FIG. 5 is a flowchart showing an example of the process in step S100 in FIG. 4 in more detail. The flowchart in FIG. 5 shows an example of the criterion by which a communication protocol is selected when data is transmitted from image forming unit 30 to server 50.

Referring to FIG. 5, in step S201, communication protocol selector 70 of image forming unit 30 in FIG. 3 determines whether the transmission destination of data is server 50. If the transmission destination is not server 50 (NO in step S201), communication protocol selector 70 proceeds to step S206. The transmission destination of data in this case is a device connected to external network 510 in FIG. 2. In step S206, communication protocol selector 70 then selects TCP as the communication protocol of the transport layer. Since the reliability of communication is thus ensured, the risk of data tampering is reduced when image forming unit 30 communicates with a device connected to the external network.

On the other hand, if the transmission destination is server 50 (YES in step S201), communication protocol selector 70 proceeds to step S202.

In step S202, communication protocol selector 70 of image forming unit 30 determines whether data transmitted by transceiver 80 is an image log. If data transmitted by transceiver 80 is an image log (YES in step S202), communication protocol selector 70 selects UDP as the communication protocol of the transport layer in step S207. The process thereafter returns to the main process.

Here, the image log in the present embodiment refers to data in which a log of a job executed by image forming unit 30 is stored as image data. Image forming unit 30 transmits image data treated in a job as an image log, together with the log of the job, to the server, thereby allowing the user to learn later what image is printed or transmitted by image forming unit 30. This function is referred to as image log transfer function.

When image forming unit 30 performs the image log transfer function, image transfer from image forming unit 30 to server 50 occurs in addition to execution of a variety of jobs in image forming unit 30. Delay in the image transfer affects execution of a variety of jobs in image forming unit 30. For example, it affects execution of a transmission-related job such as Scan to E-mail that transmits scan data by email to a device connected to the external network. In the case in the present embodiment, since an image log is transferred via UDP, delay in image log transfer can be prevented, unlike conventional transfer via TCP. This can suppress the effect on other transmission-related jobs in which communication is performed via TCP.

In an image log, at least one of encryption, data compression, or conversion to PDF is performed. Therefore, when a communication error occurs due to noise or the like, the receiver side fails to decode, decompress, or read PDF in an image log, so that the user can detect occurrence of the communication error. The transfer of an image log from image forming unit 30 to server 50 is performed using local network circuit 110. The risk of data tampering from the outside is low.

Next, if data transmitted by transceiver 80 is not an image log (NO in step S202), communication protocol selector 70 proceeds to step S203.

In step S203, communication protocol selector 70 of image forming unit 30 determines whether data transmitted by transceiver 80 is export data. Export data refers to backup data of current setting information of image forming unit 30 that is transmitted by transceiver 80 of image forming unit 30 to transceiver 100 of server 50. Export data is usually encrypted. If data transmitted by transceiver 80 is export data (YES in step S203), communication protocol selector 70 selects UDP in step S207. Even when a communication error occurs due to noise or the like, the encrypted export data is unable to be decrypted on the receiver side, so that the receiver side can detect occurrence of a communication error. The process thereafter returns to the main process.

On the other hand, if data transmitted by transceiver 80 is not export data (NO in step S203), communication protocol selector 70 proceeds to step S204.

In step S204, communication protocol selector 70 of image forming unit 30 determines whether data transmitted by transceiver 80 is scan data. Scan data refers to image data generated by scanner 40 of image forming unit 30. If data transmitted by transceiver 80 is scan data (YES in step S204), communication protocol selector 70 selects UDP in step S207. Here, even when a communication error occurs due to noise or the like, some pixels are merely missing in the scan data, which practically does not matter. Using UDP for scan data gives precedence to reduction of the time required for communication over ensuring the reliability of the content of communication. The process thereafter returns to the main process.

On the other hand, if data transmitted by transceiver 80 is not scan data (NO in step S204), communication protocol selector 70 proceeds to step S205.

In step S205, communication protocol selector 70 of image forming unit 30 determines whether data transmitted by transceiver 80 is data equal to or larger than a predetermined size. If data transmitted by transceiver 80 is data equal to or larger than a predetermined size (YES in step S205), communication protocol selector 70 selects UDP in step S207. Using UDP for data equal to larger than a predetermined size gives precedence to reduction of the time required for communication over ensuring the reliability of the content of communication. The process thereafter returns to the main process.

On the other hand, if data transmitted by transceiver 80 is not data equal to or larger than a predetermined size (NO in step S205), communication protocol selector 70 selects TCP in step S206.

Image forming unit 30 may simultaneously transmit scan data or the like to server 50 and a device such as a server or a PC connected to external network 510, for example, for sharing documents. In this case, the data is processed for each destination in accordance with the flowchart illustrated in FIG. 5. For example, in this example, data transferred by image forming unit 30 to server 50 follows the branch to YES in step S201. On the other hand, data transmitted by image forming unit 30 to a device connected to external network 510 follows the branch to NO in step S201. This is applicable to the following third and fourth embodiments.

[Transmission of Data from Server 50 to Image Forming Unit 30]

Figure 6:
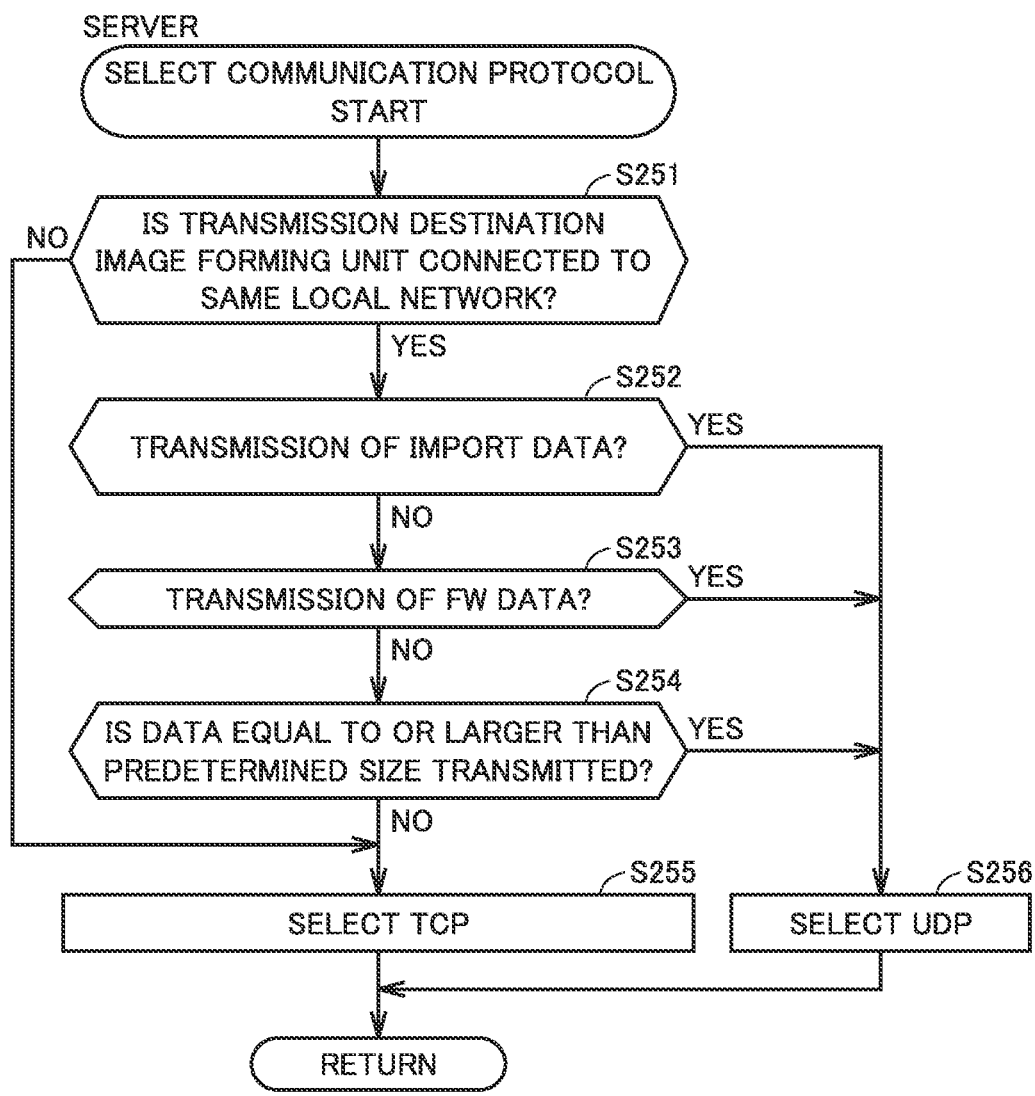
FIG. 6 is a flowchart showing another process example in step S100 in FIG. 4.

FIG. 6 is a flowchart showing another process example in step S100 in FIG. 4. FIG. 6 shows an example of the criterion by which a communication protocol is selected when data is transmitted from server 50 to image forming unit 30.

Referring to FIG. 6, in step S251, communication protocol selector 90 of server 50 in FIG. 3 determines whether the transmission destination of data is image forming unit 30. If the transmission destination is not image forming unit 30 (NO in step S251), communication protocol selector 90 proceeds to step S255. Then, in step S255, communication protocol selector 90 selects TCP as the communication protocol of the transport layer.

On the other hand, if the transmission destination is image forming unit 30 (YES in step S251), communication protocol selector 90 proceeds to step S252.

In step S252, communication protocol selector 90 of server 50 determines whether data transmitted by transceiver 80 is import data. Import data refers to change data of setting information of the image forming unit that is transmitted by transceiver 100 of server 50 to transceiver 80 of image forming unit 30. Import data is usually subjected to encryption and data compression. Therefore, if data transmitted by transceiver 80 is import data (YES in step S252), communication protocol selector 90 selects UDP as the communication protocol of the transport layer in step S256, in the same manner as for export data. The process thereafter returns to the main process.

On the other hand, if data transmitted by transceiver 100 is not import data (NO in step S252), communication protocol selector 90 proceeds to step S253.

In step S253, communication protocol selector 90 of server 50 determines whether data transmitted by transceiver 80 is update data of firmware (FW) for the image forming unit. The FW data transmitted to image forming unit 30 may be update data of the entire firmware or may be update data of part of firmware. FW data usually includes an error detection code such as checksum.

If data transmitted by transceiver 80 is FW data (YES in step S253), communication protocol selector 90 selects UDP as the communication protocol of the transport layer in step S256. Here, even when a communication error occurs due to noise or the like, the receiver side can detect occurrence of a communication error using an error detection code, and therefore it does not matter if UDP that does not ensure the reliability of communication is used.

On the other hand, if data transmitted by transceiver 100 is not FW data (NO in step S253), communication protocol selector 90 proceeds to step S254.

In step S254, communication protocol selector 90 of server 50 determines whether data transmitted by transceiver 80 is data equal to or larger than a predetermined size. If data transmitted by transceiver 100 is data equal to or larger than a predetermined size (YES in step S254), communication protocol selector 90 selects UDP in step S256. The process thereafter returns to the main process.

On the other hand, if data transmitted by transceiver 100 is not data equal to or larger than a predetermined size (NO in step S254), in step S255, communication protocol selector 90 selects TCP.

[Other Modifications]

Figure 7:
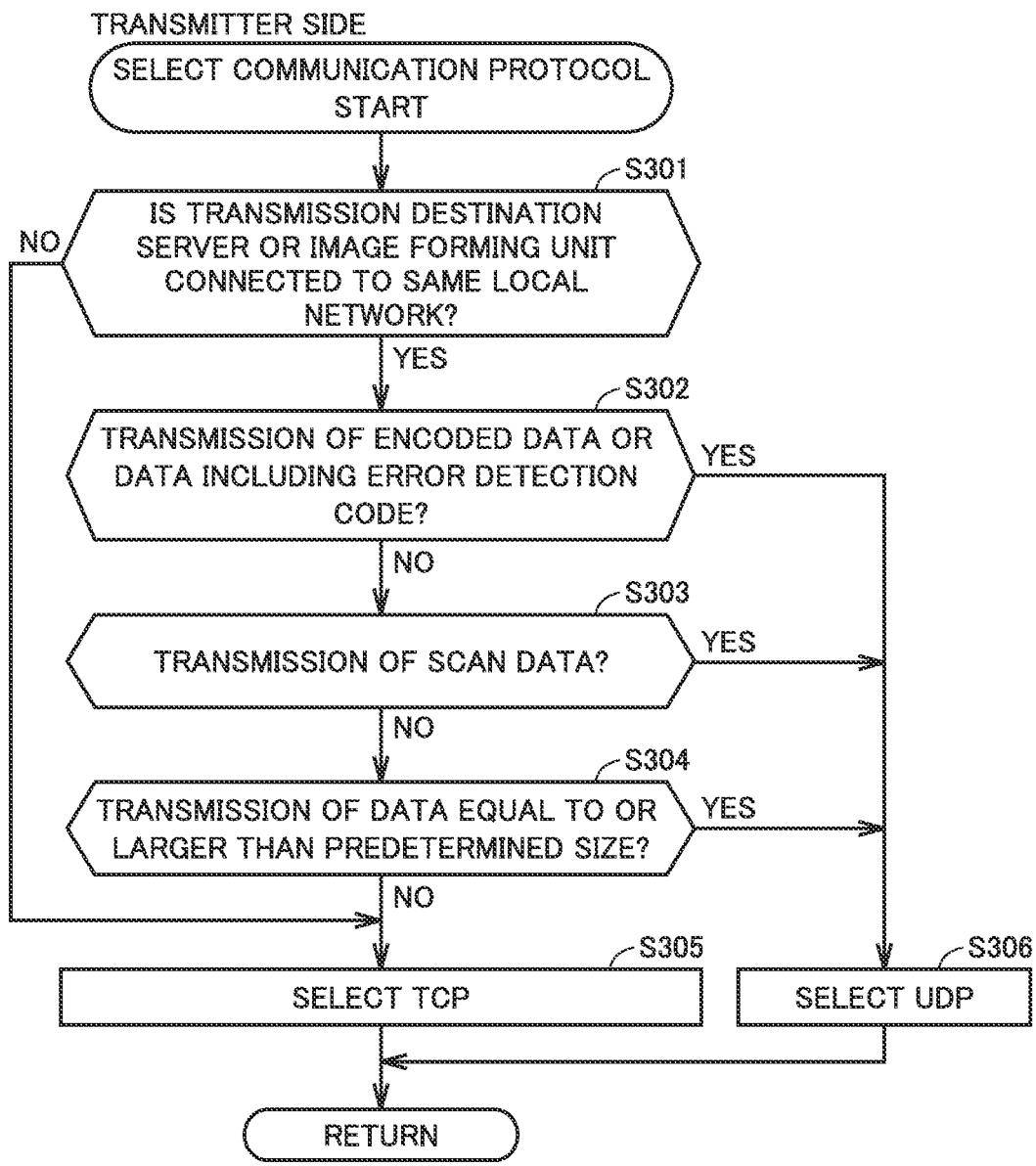
FIG. 7 is a flowchart showing yet another example of the process in step S100 in FIG. 4.

FIG. 7 is a flowchart showing yet another example of the process in step S100 in FIG. 4. The process shown in FIG. 7 can be considered as a process in which the process shown in FIG. 5 and the process shown in FIG. 6 are combined in view of kinds of transmission data.

In step S301, communication protocol selector 70 or 90 on the transmitter side in FIG. 3 determines whether the transmission destination of data is a server or an image forming unit connected to the same local network. If the transmission destination is not a server or an image forming unit connected to the same local network circuit 110 (NO in step S301), communication protocol selector 70 or 90 on the transmitter side proceeds to step S305. The transmission destination of data in this case is a device connected to external network 510 in FIG. 2. Therefore, in step S301, the communication protocol selector on the transmitter side selects TCP as the communication protocol of the transport layer.

On the other hand, if the transmission destination is server 50 or image forming unit 30 connected to the same local network (YES in step S301), communication protocol selector 70 or 90 on the transmitter side proceeds to step S302.

In step S302, communication protocol selector 70 or 90 on the transmitter side determines whether data transmitted by the transceiver on the transmitter side is encoded data or data including an error detection code. Encoding refers to encryption or compression. The image log in step S202 and export data in step S203 in FIG. 5, and import data in step S252 in FIG. 6 correspond to encoded data. FW data in step S253 in FIG. 6 corresponds to data including an error detection code. If data transmitted by transceiver 80 is encoded data or data including an error detection code (YES in step S302), communication protocol selector 70 or 90 on the transmitter side selects UDP in step S306. The process thereafter returns to the main process.

On the other hand, data transmitted by the transceiver on the transmitter side is not encoded data or data including an error detection code (NO in step S302), communication protocol selector 70 or 90 on the transmitter side proceeds to step S303.

In step S303, communication protocol selector 70 or 90 on the transmitter side determines whether data transmitted by the transceiver on the transmitter side is scan data. Step S303 corresponds to step S204 in FIG. 5. If data transmitted by the transceiver on the transmitter side is scan data (YES in step S303), the communication protocol selector on the transmitter side selects UDP in step S306. The process thereafter returns to the main process.

On the other hand, if data transmitted by the transceiver on the transmitter side is not scan data (NO in step S303), the communication protocol selector on the transmitter side proceeds to step S304.

In step S304, communication protocol selector 70 or 90 on the transmitter side determines whether data transmitted by the transceiver on the transmitter side is data equal to or larger than a predetermined size. Step S304 corresponds to step S205 in FIG. 5 and step S304 in FIG. 6. If data transmitted by the transceiver on the transmitter side is data equal to or larger than a predetermined size (YES in step S304), the communication protocol selector on the transmitter side selects UDP in step S306. The process thereafter returns to the main process.

On the other hand, if data transmitted by the transceiver on the transmitter side is not scan data (NO in step S304), communication protocol selector 70 or 90 on the transmitter side selects TCP in step S305.

D. Effects of First Embodiment

As described above, the image forming apparatus in the first embodiment is directed to a server-contained image forming apparatus. Specifically, when server 50 and image forming unit 30 (that is, the part corresponding to a conventional MFP) inside the image forming apparatus transfer data, UDP is used instead of TCP as the communication protocol, depending on data to be transmitted. This can reduce the data transfer time between server 50 and image forming unit 30 and therefore can improve the processing performance when server 50 and image forming unit 30 operate in cooperation with each other.

Specifically, transfer data for which UDP is used as the communication protocol of the transport layer includes, for example, an image log, setting information of the image forming unit (import data, export data), update data of firmware, or scan data.

The image log is data, for example, subjected to encryption, compression, or conversion to PDF. The setting information of the image forming unit is encoded, for example, encrypted or compressed data, similar to the image log, and the update data of firmware includes an error detection code. In any case, occurrence of a communication error can be detected on the receiver side. In the case of scan data, practically it does not matter if some of pixels are missing due to a communication error by noise or the like. Hence, as for transfer of these data, UDP that puts emphasis on communication speed is preferable to using TCP that ensures the reliability of communication, in terms of improving the performance of the server-contained MFP.

Second Embodiment

A second embodiment will be described below. In the second embodiment, the cooperative operation between image forming unit 30 and server 50 in such a case that a document image scanned by image forming unit 30 is previewed on server 50 will be described. The hardware configuration and the functional configuration related to data transfer of the image forming apparatus in the second embodiment are similar to those described with reference to FIG. 2 and FIG. 3 in the first embodiment and will not be further elaborated.

Figure 8A:
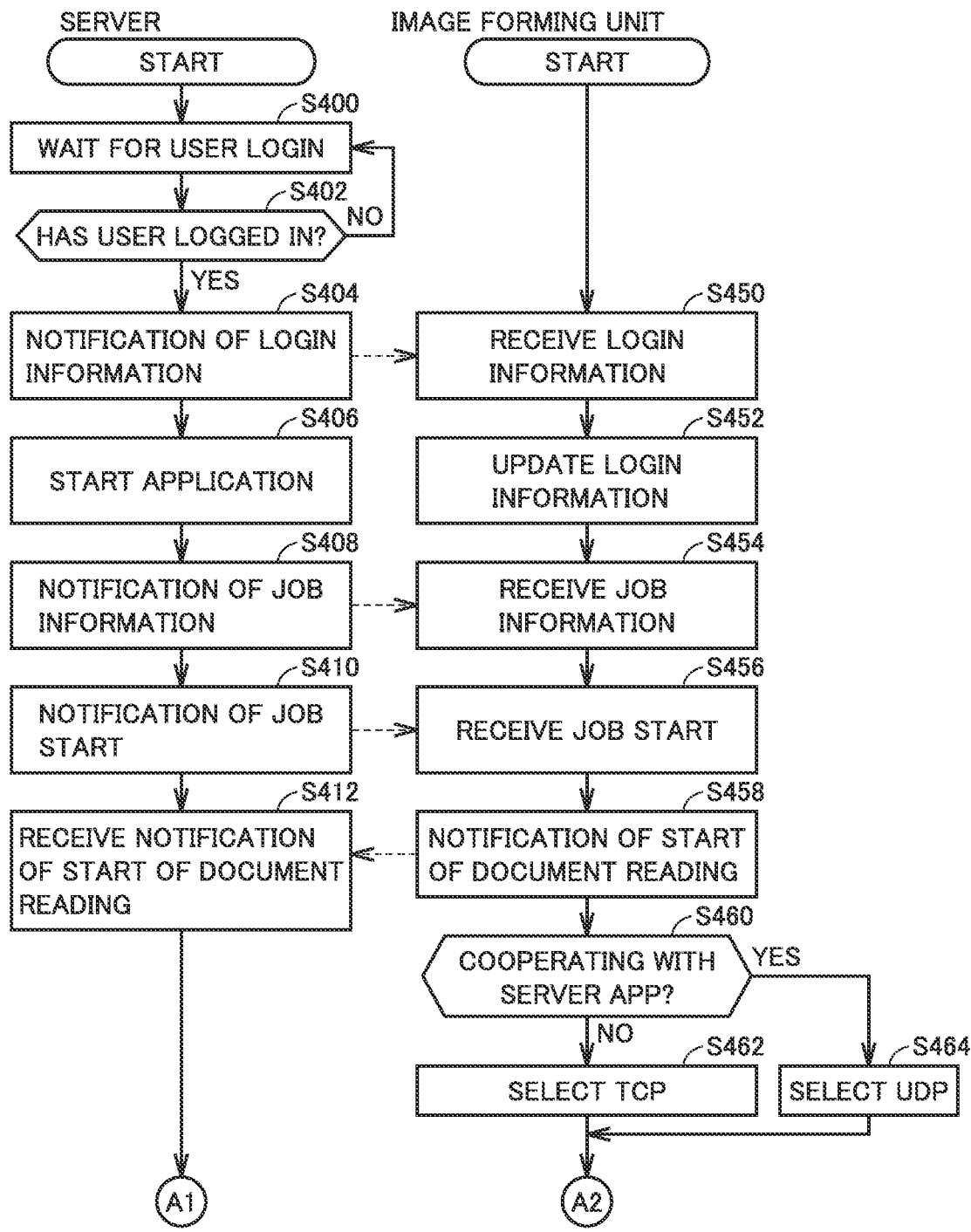
FIG. 8A is a flowchart showing the procedure of preview in the image forming apparatus in a second embodiment.
Figure 8B:
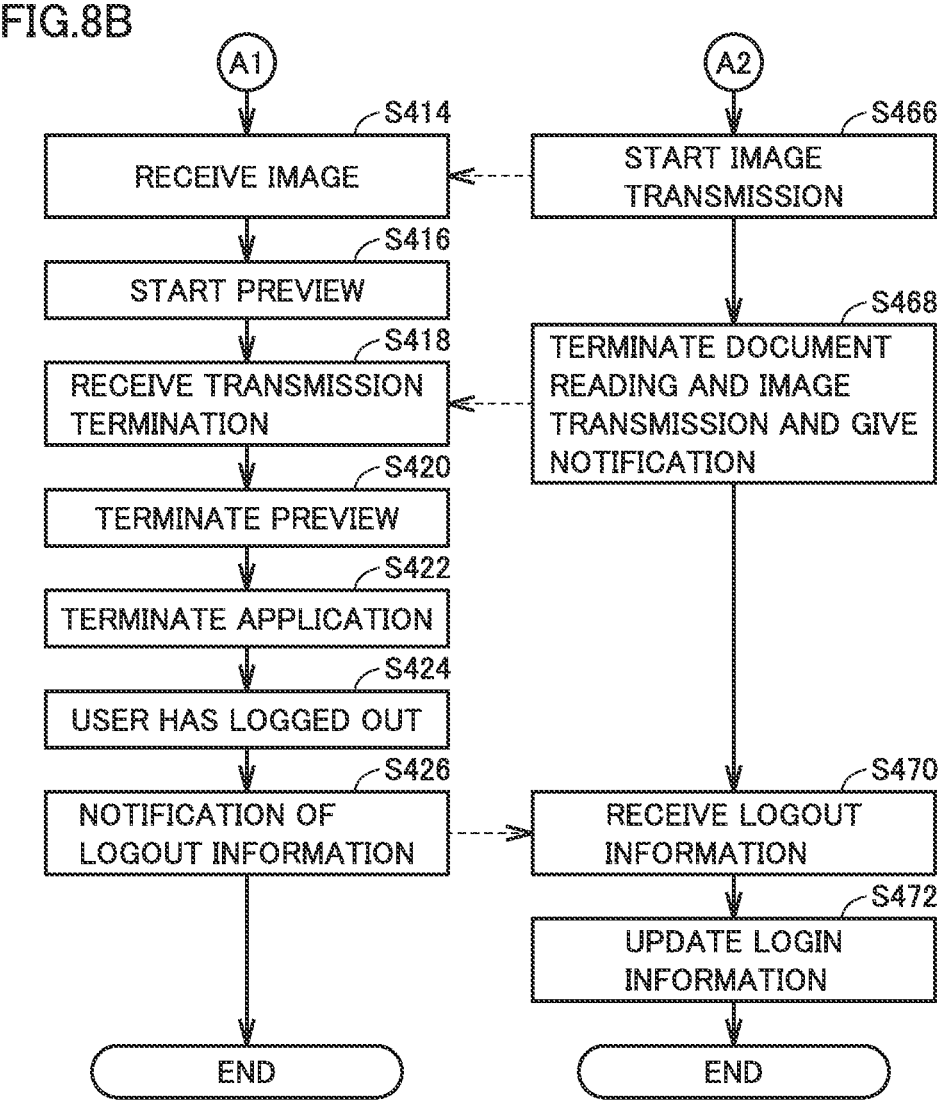
FIG. 8B is a flowchart showing the procedure of preview in the image forming apparatus in the second embodiment.

Referring to FIG. 2, FIG. 8A, and FIG. 8B, a control structure of the image forming apparatus according to the second embodiment will be described. FIG. 8A and FIG. 8B are flowcharts showing the procedure of preview in the image forming apparatus in the second embodiment. In the second embodiment, transceiver 80 of image forming unit 30 transmits a document image obtained by a scan by scanner 40 to transceiver 100 of server 50, and server 50 previews the document image.

As shown in FIG. 8A, in step S400, CPU 51 of server 50 in FIG. 2 waits for a user to log in through input device 37. Since it is premised that the function in the present second embodiment is the function implemented mainly by an application in server 50, user login is determined in server 50. User login can be determined either by an application on image forming unit 30 or by an application on server 50, and the device that a user logs in to is not limited.

In step S402, CPU 51 determines whether a user has logged in. If a user has logged in (YES in step S402), CPU 51 stores login information and job information into auxiliary storage device 53 or RAM 54 and proceeds to step S404. The login information is information indicating that the user has logged in and includes, for example, user identification information such as user name, user ID, and password. The job information is, for example, information for specifying the job such as job name and job creation date and time. If the user has not logged in (NO in step S402), CPU 51 returns to step S400.

In step S404, CPU 51 notifies CPU 32 of image forming unit 30 of the user login information stored in auxiliary storage device 53 or RAM 54 through network controller 55. When notification of login information is given, TCP is used as the communication protocol of the transport layer. This is applicable to the following third and fourth embodiments. CPU 51 thereafter proceeds to step S406.

In step S450, CPU 32 of image forming unit 30 receives the login information transmitted from server 50 through network controller 39, and CPU 32 proceeds to step S452.

In step S452, CPU 32 updates the storage area for login information in auxiliary storage device 33 or RAM 35 with the received login information and then proceeds to step S454.

In step S406, CPU 51 of server 50 starts an application for preview, based on an instruction by the user through input device 37, and proceeds to step S408.

In step S408, CPU 51 notifies image forming unit 30 of the job information stored in auxiliary storage device 53 or RAM 54 through network controller 55 and proceeds to step S410. TCP is used as the communication protocol of the transport layer when notification of job information is given. TCP is used similarly in the following third and fourth embodiments.

In step S454, CPU 32 of image forming unit 30 receives notification of the job information from server 50 through network controller 39.

In step S410, CPU 51 of server 50 starts a job and notifies image forming unit 30 of the job start through network controller 55.

In step S456, CPU 32 of image forming unit 30 receives notification of the job start from server 50 through network controller 39 and proceeds to step S458.

In step S458, CPU 32 of image forming unit 30 instructs scanner 40 to scan a document, and scanner 40 starts scanning. CPU 32 thereafter notifies server 50 of the start of document reading through network controller 39. TCP is used as the communication protocol of the transport layer when notification of the start or termination of document reading is given, and TCP is used similarly in the following third and fourth embodiments.

In step S412, CPU 51 of server 50 receives the notification of the start of document reading transmitted from image forming unit 30 through network controller 55.

In step S460, CPU 32 (that is, communication protocol selector 70 in FIG. 3) of image forming unit 30 determines whether the job is cooperating with an application on server 50, based on the job information. In this process example, the job is cooperating with an application on server 50 (YES in step S460), and CPU 32 proceeds to step S464. In step S464, CPU 32 selects UDP as the communication protocol of the transport layer in transmission of data from image forming unit 30 to server 50. CPU 32 then proceeds to step S466 in FIG. 8B.

Unlike the present example, in step S460, if CPU 32 (that is, communication protocol selector 70 in FIG. 3) determines that the job is not cooperating with an application on server 50 (NO in step S460), the process proceeds to step S462. Examples include a case where the server previews a document image read by another image forming apparatus connected to the external network. In step S462, CPU 32 selects TCP as the communication protocol of the transport layer in transmission of data from image forming unit 30 to server 50.

In step S466, CPU 32 (that is, transceiver 80 in FIG. 3) transmits the image data read by scanner 40 to server 50 through network controller 39. In doing so, transceiver 80 transmits data in accordance with the communication protocol of the transport layer selected in step S462 or step S464. In this process example, UDP is selected in step S464 and data is transmitted using UDP.

In step S414, CPU 51 of server 50 receives the image data transmitted from image forming unit 30 through network controller 55. CPU 51 thereafter stores the received image data into auxiliary storage device 53 and proceeds to step S416.

In step S416, CPU 51 starts preview by displaying the image data stored in auxiliary storage device 53 in step S414 on display device 38.

In step S468, CPU 32 of image forming unit 30 terminates document reading by scanner 40 and terminates transmission of an image to server 50 through network controller 39. CPU 32 then notifies server 50 of these termination and proceeds to step S470. TCP is used as the communication protocol of the transport layer in notification of termination of data transmission. TCP is used similarly in the following third and fourth embodiments.

In step S418, CPU 51 of server 50 receives the notification that document reading by image forming unit 30 and transmission of an image to server 50 are terminated through network controller 55 and proceeds to step S420.

In step S420, CPU 51 gives an instruction to display device 38 to terminate the preview and proceeds to step S422.

In step S422, CPU 51 terminates the application for preview and proceeds to step S424.

In step S424, CPU 51 proceeds to step S426 in response to the user logging out using input device 37.

In step S426, CPU 51 gives notification of logout information to image forming unit 30 through network controller 55 and terminates a series of process steps. The logout information is information indicating that the user has logged out and includes, for example, user identification information such as user name and user ID. TCP is used as the communication protocol of the transport layer in notification of logout information. TCP is used similarly in the following third and fourth embodiments.

In step S470, CPU 32 of image forming unit 30 receives the logout information from server 50 through network controller 39 and proceeds to step S472.

In step S472, CPU 32 updates the storage area for logout information in auxiliary storage device 33 or RAM 35 with the received logout information and terminates a series of process steps.

Effects of Second Embodiment

Conventionally, the document reading in image forming unit 30 has been speeded up year by year, for example, by reading both sides simultaneously. Meanwhile, it takes time to transfer a read document image from image forming unit 30 to server 50. Consequently, it has been difficult to preview the document image read by image forming unit 30 in real time in the application on server 50.

By contrast, the image forming apparatus in the second embodiment uses UDP as the communication protocol when transferring the read image from image forming unit 30 to server 50 and thus can reduce the time taken to transfer the document image. The real-time performance in preview of a document image therefore can be improved.

Third Embodiment

In the third embodiment, the cooperative operation between image forming unit 30 and server 50 in an OCR process will be described as an example of a case where image forming unit 30 and server 50 cooperate to perform image processing. The hardware configuration and the functional configuration related to data transfer of the image forming apparatus in the third embodiment are similar to those described with reference to FIG. 2 and FIG. 3 in the first embodiment and will not be further elaborated.

Although server 50 alone has image processor 94 in FIG. 3, image forming unit 30 may also have a corresponding image processor. For example, such image processing that does not burden image forming unit 30 may be processed by the image processor provided in image forming unit 30, instead of the image processor 94 in server 50.

Figure 9A:
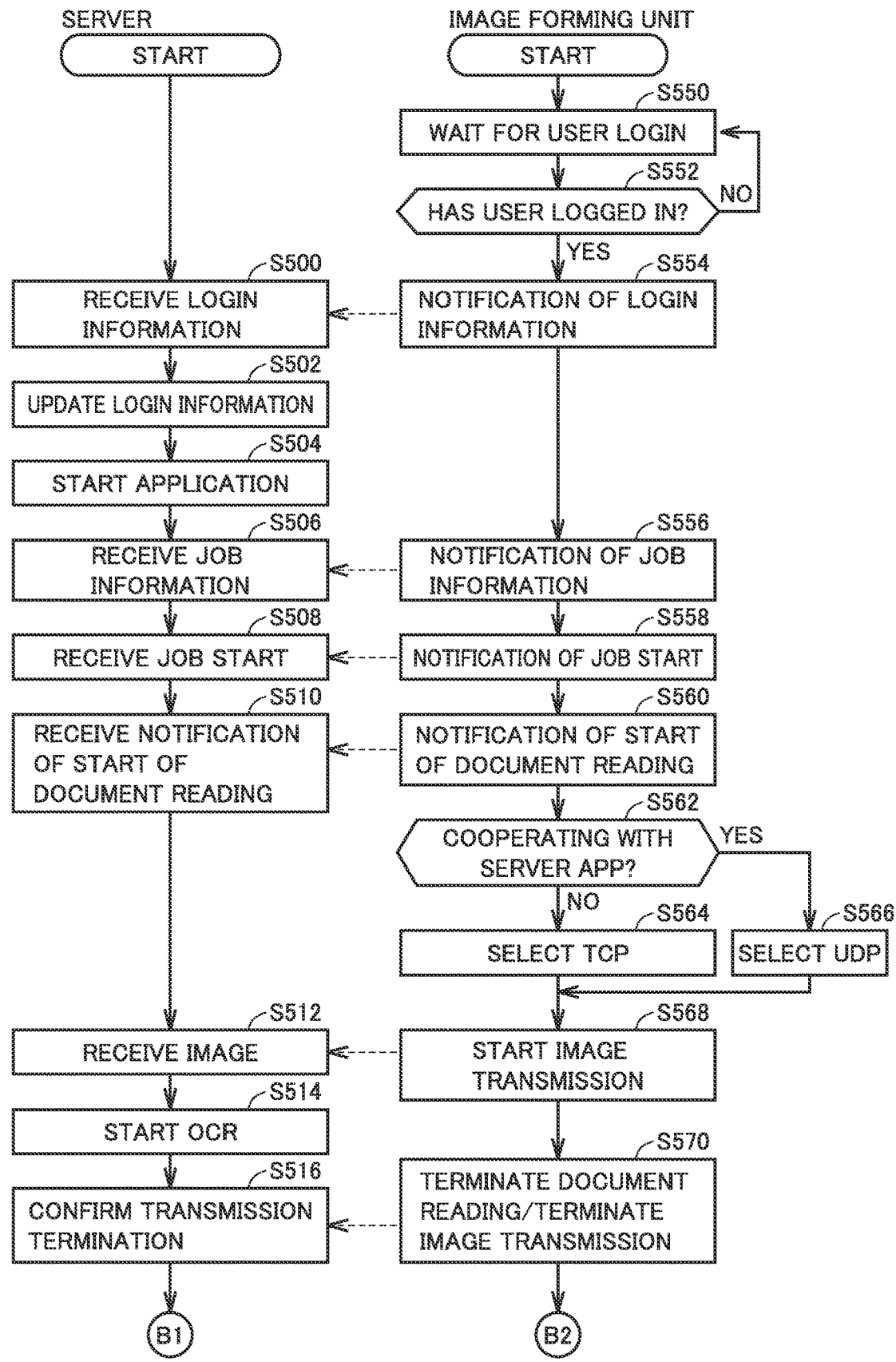
FIG. 9A is a flowchart showing the procedure of an OCR process in image forming apparatus 500 in a third embodiment.

Referring to FIG. 2, FIG. 9A, and FIG. 9B, the control structure of image forming apparatus 500 will be described. FIG. 9A and FIG. 9B are flowcharts showing the procedure of an OCR process in image forming apparatus 500 in the third embodiment. In the present third embodiment, the document image scanned by image forming unit 30 undergoes an OCR process in server 50, and data generated as a result of the process is returned to image forming unit 30. While the dialog with a user and the overall control are executed by CPU 32 of image forming unit 30, the OCR process that burdens the CPU is executed by server 50.

As shown in FIG. 9A, in step S550, CPU 32 of image forming unit 30 in FIG. 2 waits for user login.

In step S552, CPU 32 determines whether a user has logged in. If a user has logged in (YES in step S552), CPU 32 stores login information and job information into auxiliary storage device 33 or RAM 35 and proceeds to step S554. If a user has not logged in (NO in step S552), CPU 32 returns to step S550.

In step S554, CPU 32 notifies CPU 51 of server 50 of the user's login information stored in auxiliary storage device 33 or RAM 35 through network controller 39. CPU 32 of image forming unit 30 then proceeds to step S556.

In step S500, CPU 51 of server 50 receives the login information transmitted from image forming unit 30 through network controller 55 and proceeds to step S502.

In step S502, CPU 51 updates the storage area for login information in auxiliary storage device 53 or RAM 54 with the received login information and then proceeds to step S504.

In step S504, CPU 51 starts an application for OCR based on an instruction by the user through input device 37.

In step S556, CPU 32 of image forming unit 30 notifies server 50 of the job information stored in auxiliary storage device 33 or RAM 35 through network controller 39 and proceeds to step S558.

In step S506, CPU 51 of server 50 receives notification of the job information from image forming unit 30 through network controller 55.

In step S558, CPU 32 of image forming unit 30 notifies server 50 of the job start through network controller 39 and proceeds to step S560.

In step S508, CPU 51 of server 50 receives notification of the job start from image forming unit 30 through network controller 55.

In step S560, CPU 32 of image forming unit 30 instructs scanner 40 to scan a document, and scanner 40 starts a scan. CPU 32 then notifies server 50 of the start of document reading through network controller 39.

In step S510, CPU 51 of server 50 receives the notification of document reading transmitted from image forming unit 30 through network controller 55.

In step S562, CPU 32 (that is, communication protocol selector 90 in FIG. 3) of image forming unit 30 determines whether the job is cooperating with an application on server 50, based on the job information. If CPU 32 determines that the job is cooperating with an application on server 50 (YES in step S562), the process proceeds to step S566. This is the case with the present embodiment in which CPU 32 of image forming unit 30 transfers a document image generated by scanner 40 to server 50. In step S566, CPU 32 selects UDP as the communication protocol of the transport layer in transmission of data from image forming unit 30 to server 50. CPU 32 thereafter proceeds to step S568.

On the other hand, in step S562, if CPU 32 (that is, communication protocol selector 90 in FIG. 3) determines that the job is not cooperating with an application on server 50 (NO in step S562), the process proceeds to step S564. Examples include a case where the server performs an OCR process on the document image read by another image forming apparatus connected to external network 510. In step S564, CPU 32 selects TCP as the communication protocol of the transport layer in transmission of data from image forming unit 30 to server 50.

In step S568, CPU 32 (that is, transceiver 100 in FIG. 3) transmits the image data scanned by scanner 40 to server 50 through network controller 39. When image data is transferred, the communication protocol selected in step S564 or step S566 is used. In this process example, server 50 and image forming unit 30 are cooperating, and CPU 32 transfers the scanned image data to server 50 using UDP as the communication protocol of the transport layer.

In step S512, CPU 51 of server 50 receives the image data transmitted from image forming unit 30 through network controller 55 and stores the image data into auxiliary storage device 53.

In step S514, CPU 51 starts an OCR process on the image data stored in auxiliary storage device 53.

In step S570, CPU 32 of image forming unit 30 terminates document reading by scanner 40 and terminates transmission of the read document image to server 50 through network controller 39.

In step S516, CPU 51 of server 50 confirms termination of transmission of the image to server 50 by image forming unit 30.

In step S518, CPU 51 completes the OCR process and thereafter proceeds to step S520.

In step S520, CPU 51 generates a file as a result of the OCR process and proceeds to step S522.

In step S522, CPU 51 (that is, communication protocol selector 90 in FIG. 3) of server 50 determines whether the job is cooperating with an application on image forming unit 30, based on the job information. If CPU 51 determines that the job is cooperating with an application on image forming unit 30 (YES in step S522), the process proceeds to step S526. This is the case with the present embodiment in which CPU 51 of server 50 transfers the result of the OCR process to image forming unit 30. In step S526, CPU 51 selects UDP as the communication protocol of the transport layer in transmission of data from server 50 to image forming unit 30. CPU 32 thereafter proceeds to step S528.

On the other hand, in step S522, if CPU 51 (that is, communication protocol selector 90 in FIG. 3) determines that the job is not cooperating with an application on image forming unit 30 (NO in step S522), the process proceeds to step S524. Examples include a case where CPU 51 of server 50 transmits a file generated as a result of the OCR process to another image forming apparatus connected to external network 510. In step S524, CPU 32 selects TCP as the communication protocol of the transport layer in transmission of data from server 50 to image forming unit 30.

In step S528, CPU 51 (that is, transceiver 100 in FIG. 3) transmits the file generated in step S520 to image forming unit 30 through network controller 55 and proceeds to step S530. In file transfer, the communication protocol selected in step S524 or step S526 is used. In this process example, server 50 and image forming unit 30 are cooperating, and CPU 51 transfers the generated file to image forming unit 30 using UDP as the communication protocol of the transport layer.

In step S572, CPU 32 of image forming unit 30 receives the file transmitted from server 50 through network controller 39 and stores the file into auxiliary storage device 33. CPU 32 thereafter proceeds to step S574.

In step S530, CPU 51 of server 50 terminates the application for OCR.

In step S574, CPU 32 of image forming unit 30 transmits the file stored in auxiliary storage device 33 in step S572 to the specified destination through network controller 39. The specified destination includes a device connected to external network 510.

In step S576, CPU 32 stores logout information into auxiliary storage device 33 or RAM 35 in response to the user logging out using input device 37 and proceeds to step S578.

In step S578, CPU 32 notifies server 50 of the logout information stored in auxiliary storage device 33 or RAM 35 in step S576 through network controller 39 and terminates a series of process steps in image forming unit 30.

In step S532, CPU 51 of server 50 receives the logout information from image forming unit 30 through network controller 55 and proceeds to step S534.

In step S534, CPU 51 updates the storage area for logout information in auxiliary storage device 53 or RAM 54 with the received logout information and terminates a series of process steps in server 50.

Effects of Third Embodiment

In the image forming apparatus in the third embodiment, when a document image generated by image forming unit 30 is transferred to server 50 in order to use the image processing function such as OCR process, and when server 50 transfers data of a file generated as a result of image processing to image forming unit 30, data is transmitted using UDP. The overall time required for the OCR process thus can be reduced.

Fourth Embodiment

In a fourth embodiment, the cooperative operation between image forming unit 30 and server 50 when image forming unit 30 accesses server 50 and uses a pull print function of printing data accumulated in server 50 will be described. The pull print function also includes a case where the image forming apparatus accesses a storage device external to the image forming apparatus and data accumulated in the storage device is printed in the image forming apparatus. The hardware configuration and the functional configuration related to data transfer of the image forming apparatus in the fourth embodiment are similar to those described with reference to FIG. 2 and FIG. 3 in the first embodiment and will not be further elaborated.

Figure 10A:
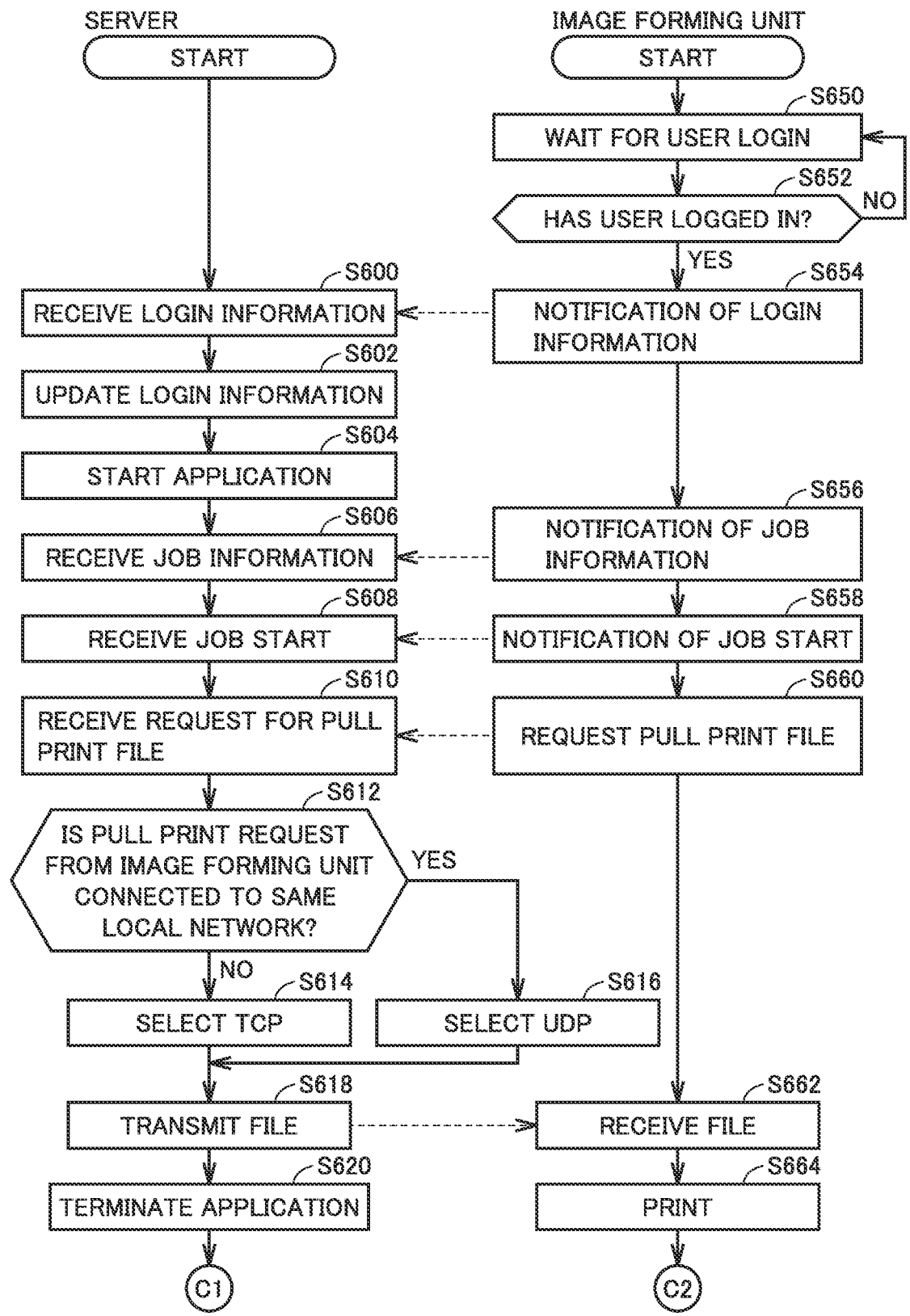
FIG. 10A is a flowchart showing the procedure of pull print in image forming apparatus 500 in a fourth embodiment.
Figure 10B:
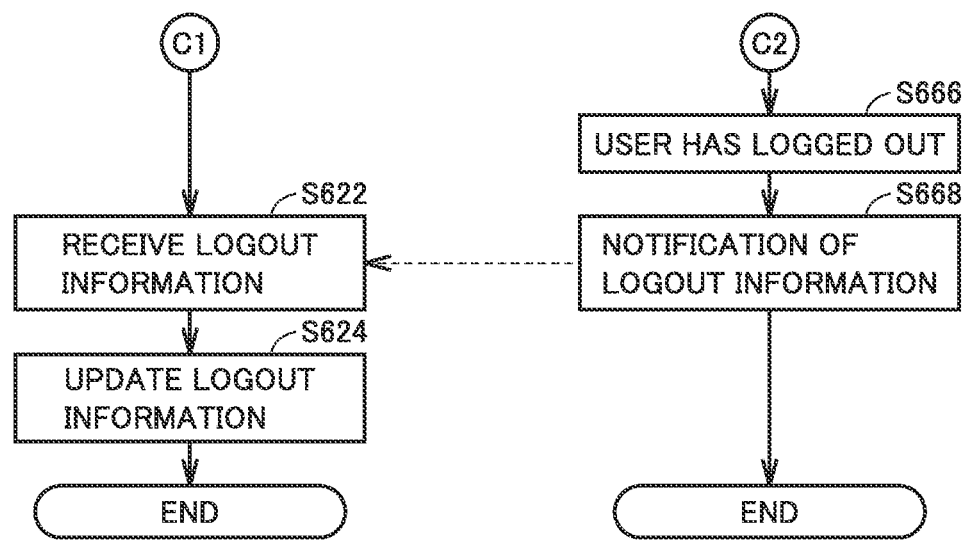
FIG. 10B is a flowchart showing the procedure of pull print in image forming apparatus 500 in the fourth embodiment.

FIG. 10A and FIG. 10B are flowcharts showing the procedure of pull print in image forming apparatus 500 in the fourth embodiment.

Referring to FIG. 2 and FIG. 10A, in step S650, CPU 32 of image forming unit 30 waits for user login. Since the function in the present fourth embodiment is the function implemented mainly by an application on image forming unit 30, login is determined in image forming unit 30.

In step S652, CPU 32 determines whether a user has logged in. If a user has logged in (YES in step S652), CPU 32 stores login information and job information into auxiliary storage device 33 or RAM 35 and proceeds to step S654. If a user has not logged in (NO in step S552), CPU 32 returns to step S650.

In step S654, CPU 32 notifies CPU 51 of server 50 of the user's login information stored in auxiliary storage device 33 or RAM 35 through network controller 39. CPU 32 of image forming unit 30 then proceeds to step S656.

In step S600, CPU 51 of server 50 receives the login information transmitted from image forming unit 30 through network controller 55 and proceeds to step S602.

In step S602, CPU 51 updates the storage area for login information in auxiliary storage device 53 or RAM 54 with the received login information and then proceeds to step S604.

In step S604, CPU 51 starts an application for pull print based on an instruction by the user through input device 37.

In step S656, CPU 32 of image forming unit 30 notifies server 50 of the job information stored in auxiliary storage device 33 or RAM 35 through network controller 39 and proceeds to step S658.

In step S606, CPU 51 of server 50 receives notification of the job information from image forming unit 30 through network controller 55.

In step S658, CPU 32 of image forming unit 30 starts the job, notifies server 50 of the job start through network controller 39, and proceeds to step S660.

In step S608, CPU 51 of server 50 receives notification of the job start from image forming unit 30 through network controller 55.

In step S660, the user specifies a file that the user wishes to print (hereinafter referred to as pull print file) from among data accumulated in ROM 52 of server 50 through input device 37. CPU 32 of image forming unit 30 thereafter requests CPU 51 of server 50 to transmit the pull print file to image forming unit 30 through network controller 55, in response to the user's instruction. In doing so, CPU 32 uses TCP as the communication protocol.

In step S610, CPU 51 of server 50 receives the request for the pull print file through network controller 55 and proceeds to step S612.

In step S612, CPU 51 (that is, communication protocol selector 90 in FIG. 3) determines whether the request for the pull print file is a request from the image forming unit connected to the same local network, based on the job information. If CPU 51 determines that the request for the pull print file is a request from image forming unit 30 connected to the same local network (YES in step S612), the process proceeds to step S616. In step S616, CPU 51 selects UDP as the communication protocol of the transport layer in transmission of data from server 50 to image forming unit 30. CPU 51 then proceeds to step S618.

On the other hand, in step S612, if the request for the pull print file is not a request from the image forming unit connected to the same local network (NO in step S612), CPU 51 (that is, communication protocol selector 90 in FIG. 3) proceeds to step S614. Examples include a case where a pull print process is performed on image data stored in a storage device connected to external network 510. In this case, in step S614, CPU 32 selects TCP as the communication protocol of the transport layer in transmission of data from server 50 to image forming unit 30. CPU 51 then proceeds to step S618.

In step S618, CPU 51 (that is, transceiver 100 in FIG. 3) transmits the pull print file to image forming unit 30 through network controller 55 and proceeds to step S620. UDP selected in step S614 or TCP selected in step S616 is used as the communication protocol of the transport layer in data transfer.

In step S662, CPU 32 of image forming unit 30 receives the pull print file transmitted from server 50 through network controller 39 and proceeds to step S664.

In step S620, CPU 51 of server 50 terminates the application for pull print.

In step S664, CPU 32 of image forming unit 30 sends an instruction to printer 41 to print the pull print file received in step S662.

In step S666, CPU 32 stores logout information into auxiliary storage device 33 or RAM 35 in response to the user logging out using input device 37 and proceeds to step S668.

In step S668, CPU 32 notifies server 50 of the logout information stored in auxiliary storage device 33 or RAM 35 in step S666 through network controller 39 and terminates a series of process steps in image forming unit 30.

In step S622, CPU 51 of server 50 receives the logout information from image forming unit 30 through network controller 55 and proceeds to step S624.

In step S624, CPU 51 updates the storage area for logout information in auxiliary storage device 53 with the received logout information and terminates a series of process steps in server 50.

Effects of Fourth Embodiment

The image forming apparatus in the fourth embodiment uses UDP in transfer of data of a pull print file between image forming unit 30 and server 50, thereby reducing the time required for data transfer. As a result, the time required for a pull print process can be reduced. When the transfer destination of a pull print file is a device connected to external network 510, TCP is used as a communication protocol, thereby increasing the reliability of communication. In the case where the pull print file is image data, it practically does not matter even if UDP that does not ensure the reliability of communication is used and consequently, image data is printed with some pixels missing due to a communication error due to noise or the like.

<Modifications>

Although TCP is employed as an example of the first protocol and UDP is employed as an example of the second protocol in the present disclosure, the range of application of the disclosed technical idea is not limited thereto. Although the TCP/IP model is used as a network model in the present disclosure, the above range is not limited thereto.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising:
   an image forming unit including a scanner configured to scan a document to generate image data and a printer configured to print image data generated by the scanner or another image data on a recording medium;
   a server; and
   a local network circuit configured to connect the image forming unit and the server,
   the image forming unit and the server each including:
      a transceiver configured to transmit and receive data through the local network circuit; and
      a hardware processor, wherein
   the hardware processor of one of the image forming unit and the server selects one of a first communication protocol and a second communication protocol in accordance with data transmitted by the transceiver of the one of the image forming unit and the server when data is transmitted by the transceiver of the one to the transceiver of the other,
   the first communication protocol includes a provision for ensuring reliability of communication, and
   the second communication protocol does not include a provision for ensuring reliability of communication.

2. The image forming apparatus according to claim 1, wherein
   the first communication protocol is Transmission Control Protocol (TCP), and
   the second communication protocol is User Datagram Protocol (UDP).

3. The image forming apparatus according to claim 1, wherein the hardware processor of one of the image forming unit and the server selects the second communication protocol when encoded data is transmitted by the transceiver of the one to the transceiver of the other.

4. The image forming apparatus according to claim 3, wherein the encoding includes at least one of compression, encryption, and data format conversion.

5. The image forming apparatus according to claim 1, wherein the hardware processor of one of the image forming unit and the server selects the second communication protocol when data transmitted by the transceiver of the one to the transceiver of the other includes an error detection code.

6. The image forming apparatus according to claim 1, wherein the hardware processor of one of the image forming unit and the server selects the second communication protocol when a size of data transmitted by the transceiver of the one to the transceiver of the other is equal to or greater than a predetermined threshold.

7. The image forming apparatus according to claim 1, wherein the hardware processor of the image forming unit selects the second communication protocol when image data generated by the scanner is transmitted by the transceiver of the image forming unit to the transceiver of the server.

8. The image forming apparatus according to claim 1, wherein the local network circuit is connected to an external network through a security gateway.

9. The image forming apparatus according to claim 8, wherein the hardware processor of the image forming unit selects the first communication protocol when image data generated by the scanner is transmitted by the transceiver of the image forming unit to a device connected to the external network.

10. The image forming apparatus according to claim 1, wherein the hardware processor of the image forming unit selects the second communication protocol when an image log in which a log of a job executed by the image forming unit is stored as image data is transmitted by the transceiver of the image forming unit to the transceiver of the server.

11. The image forming apparatus according to claim 1, wherein the hardware processor of the server selects the second communication protocol when import data for changing setting information of the image forming unit is transmitted by the transceiver of the server to the transceiver of the image forming unit.

12. The image forming apparatus according to claim 1, wherein the hardware processor of the image forming unit selects the second communication protocol when export data for backing up current setting information of the image forming unit is transmitted by the transceiver of the image forming unit to the transceiver of the server.

13. The image forming apparatus according to claim 1, wherein the hardware processor of the server selects the second communication protocol when update data of firmware for the image forming unit is transmitted by the transceiver of the server to the transceiver of the image forming unit.

14. The image forming apparatus according to claim 1, wherein the hardware processor of the server selects the second communication protocol when data stored in the server is transmitted by the transceiver of the server to the transceiver of the image forming unit and the stored data is printed by the printer of the image forming unit.

15. The image forming apparatus according to claim 1, wherein
the hardware processor of the server performs image processing on image data generated by the scanner, and
the hardware processor of the server selects the second communication protocol when data generated as a result of the image processing is transmitted by the transceiver of the server to the transceiver of the image forming unit.

16. The image forming apparatus according to claim 15, wherein the image processing includes an optical character recognition (OCR) process.

17. A data transfer method in an image forming apparatus, the image forming apparatus including:
an image forming unit including a scanner configured to scan a document to generate image data and a printer configured to print image data generated by the scanner or another image data on a recording medium;
a server; and
a local network circuit configured to connect the image forming unit and the server,
the data transfer method comprising:
selecting one of a first communication protocol and a second communication protocol in accordance with data to be transmitted, by a transmitter side of the image forming unit and the server, when data is transferred between the image forming unit and the server through the local network circuit; and
transmitting data by the transmitter side to a receiver side using the selected communication protocol, wherein
the first communication protocol includes a provision for ensuring reliability of communication, and
the second communication protocol does not include a provision for ensuring reliability of communication.

* * * * *